United States Patent
Caskey et al.

(10) Patent No.: US 9,313,150 B2
(45) Date of Patent: *Apr. 12, 2016

(54) GENERATING INTENTIONAL INTERRUPTIONS DURING GATHERINGS

(71) Applicant: International Business Machines Corporation, Armonk, NY (US)

(72) Inventors: Sasha P. Caskey, New York, NY (US); Robert G. Farrell, Cornwall, NY (US); Dimitri Kanevsky, Ossining, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 337 days.

This patent is subject to a terminal disclaimer.

(21) Appl. No.: 13/966,456

(22) Filed: Aug. 14, 2013

(65) Prior Publication Data

US 2014/0372538 A1    Dec. 18, 2014

Related U.S. Application Data

(63) Continuation of application No. 13/916,653, filed on Jun. 13, 2013, now Pat. No. 9,219,702.

(51) Int. Cl.
*H04L 12/58* (2006.01)
*G06F 13/24* (2006.01)

(52) U.S. Cl.
CPC ................ *H04L 51/00* (2013.01); *G06F 13/24* (2013.01); *H04L 51/046* (2013.01)

(58) Field of Classification Search
USPC ............. 715/730; 709/206; 705/14.58, 14.61, 705/15.67; 455/414.2
See application file for complete search history.

(56) References Cited

U.S. PATENT DOCUMENTS

| | | | |
|---|---|---|---|
| 4,538,993 | A | 9/1985 | Krumholz |
| 4,973,952 | A | 11/1990 | Malec et al. |
| 7,451,177 | B1 | 11/2008 | Johnson et al. |
| 7,921,036 | B1 | 4/2011 | Sharma et al. |
| 2004/0267981 | A1 | 12/2004 | Kakemura |
| 2005/0207588 | A1 | 9/2005 | Biegelsen |
| 2006/0036688 | A1 | 2/2006 | McMahan et al. |
| 2006/0270460 | A1 | 11/2006 | Konkka et al. |
| 2006/0293949 | A1 | 12/2006 | Grossnickle et al. |
| 2008/0132199 | A1 | 6/2008 | Hirata |

(Continued)

FOREIGN PATENT DOCUMENTS

EP    0788065 A2    1/1997

OTHER PUBLICATIONS

S. Di Paolo et al., "A Peripheral Notification Display for Multiple Alerts: Design Rationale," Information Systems: People, Organizations, Institutions, and Technologies, 2010, pp. 521-528.

D.C. McFarlane et al., "The Scope and Importance of Human Interruption in Human-Computer Interaction Design," Human-Computer Interaction Journal, Mar. 2002, pp. 1-61, vol. 17, No. 1.

(Continued)

*Primary Examiner* — Paul R Myers
(74) *Attorney, Agent, or Firm* — Jeff Tang; Ryan, Mason & Lewis, LLP

(57) ABSTRACT

Systems and methods for generating interruptions are provided. A method for generating interruptions, comprises generating a message for one or more recipients, detecting that a computing device is being used for a presentation, concluding, using a processor, that the one or more recipients are in an audience for the presentation, and after concluding that the one or more recipients are in the audience, interrupting the presentation with the message.

19 Claims, 8 Drawing Sheets

(56) References Cited

U.S. PATENT DOCUMENTS

| | | |
|---|---|---|
| 2009/0044246 A1 | 2/2009 | Sheehan et al. |
| 2010/0138779 A1 | 6/2010 | Portele et al. |
| 2010/0153995 A1 | 6/2010 | Belz et al. |
| 2014/0372650 A1* | 12/2014 | Caskey .................. G06F 13/24 705/14.58 |

OTHER PUBLICATIONS

S.D. Ramchurn et al., "Minimising Intrusiveness in Pervasive Computing Environments Using Multi-Agent Negotiation," First Annual International Conference on Mobile and Ubiquitous Systems: Networking and Services (MobiQuitous), Aug. 2004, pp. 364-371.

* cited by examiner

GENERATING INTENTIONAL INTERRUPTIONS DURING GATHERINGS

CROSS-REFERENCE TO RELATED APPLICATION

This application is a Continuation of U.S. application Ser. No. 13/916,653, filed on Jun. 13, 2013, the disclosure of which is incorporated herein in its entirety by reference.

TECHNICAL FIELD

The field generally relates to systems and methods for generating interruptions and, in particular, to systems and methods for generating intentional interruptions during gatherings.

BACKGROUND

People who use computers or mobile devices to display information while giving a presentation can be interrupted by unintended pop-up messages. These unintended messages may interrupt the flow of the presentation and, in some cases, can be quite annoying or even humiliating to the audience and/or the person presenting. For example, mobile text messaging frequently interrupts people, and there exists technology to suppress these messages.

However, in some situations, it may be useful to allow or even generate certain of these interruptions during presentations. Accordingly, there is a need for systems and methods for intentional generation of messages during a presentation to deliver a message to one or more people in the audience.

SUMMARY

In general, exemplary embodiments of the invention include systems and methods for generating interruptions and, in particular, to systems and methods for generating intentional interruptions during gatherings.

According to an exemplary embodiment of the present invention, a system for generating interruptions comprises a messaging module capable of generating a message for one or more recipients, and an interruption management module capable of detecting that a computing device is being used for a presentation, concluding that the one or more recipients are in an audience for the presentation, and interrupting the presentation with the message after concluding that the one or more recipients are in the audience.

According to an exemplary embodiment of the present invention, an article of manufacture comprises a computer readable storage medium comprising program code tangibly embodied thereon, which when executed by a computer, performs method steps for generating interruptions, the method steps comprising generating a message for one or more recipients, detecting that a computing device is being used for a presentation, concluding that the one or more recipients are in an audience for the presentation, and after concluding that the one or more recipients are in the audience, interrupting the presentation with the message.

According to an exemplary embodiment of the present invention, a method for generating interruptions comprises generating a message for one or more recipients, detecting that a computing device is being used for a presentation, concluding, using a processor, that the one or more recipients are in an audience for the presentation, and after concluding that the one or more recipients are in the audience, interrupting the presentation with the message.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for generating interruptions and, in particular, to systems and methods for generating intentional interruptions during gatherings. This invention may, however, be embodied in many different forms and should not be construed as limited to the embodiments set forth herein.

Embodiments of the present invention relate to the use of an interruption mechanism, such as, for example, a banner, alert, ticker, popup, etc. as a purposeful method of temporarily and intentionally switching context during a gathering, such as a conference or talk, to deliver a message to one or more people in the audience or to the presenter.

According to an embodiment of the present invention, a user can send a message, such as, for example, a text message or an e-mail, to oneself which can be viewed via the user's computing device (e.g., when the user takes their laptop with them to project a presentation), wherein viewing of the message is synchronized with the intended recipient or recipients looking at the computing device's display. According to another embodiment, a first user can send a message to a second user which can be viewed via the second user's computing device, and viewing of the message is synchronized with the intended recipient or recipients looking at the computing device's display. According to an embodiment, this scenario can occur when a user is looking at their mobile phone and someone else is looking over the user's shoulder and the message for the person looking over the user's shoulder is delivered on the phone. For example, if one comes close to another's mobile device and attends to the other's mobile phone display to watch a video, it is possible to use the embodiments of the present invention to interrupt the video to deliver the message to that person. In other words, the embodiments of the present invention are not necessarily limited to the situation of one standing in a front of a room presenting slides. Creation or generation of the message can be through a messaging module 104, for example, an e-mail, text messaging, or instant messaging system.

Figure 1:
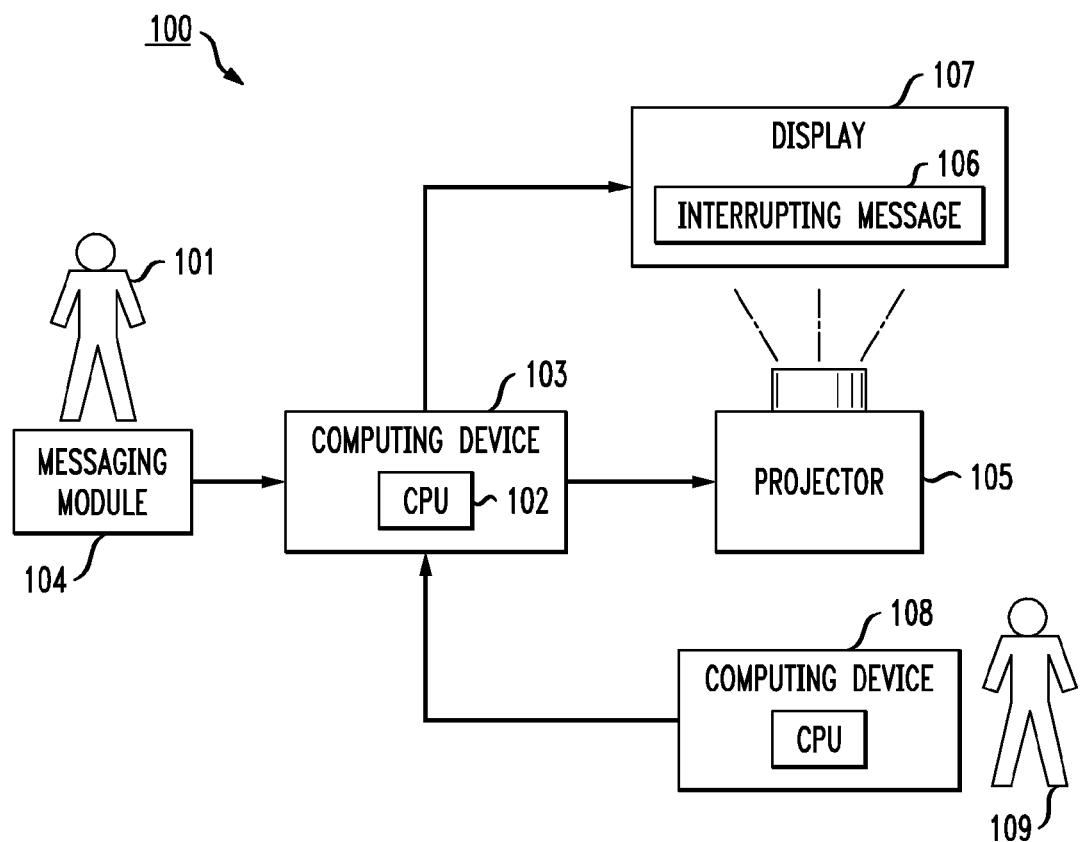
FIG. 1 is a high-level diagram of a system for generating interruptions according to an exemplary embodiment of the invention.

Referring to FIG. 1, in a system 100 for generating interruptions according to an exemplary embodiment of the present invention, given a message 106 from a sender 101 intended for one or more recipients 109, a central processing unit (CPU) 102 of a computing device 103 is able to detect when a display or a display function of the computing device 103 is being used for a primary task, such as, for example, a presentation. In accordance with embodiments of the present invention, the sender 101 or another party can be using the computing device 103 for the primary task.

According to an embodiment, the CPU 102 determines that a display or display function of the computing device 103 is being used by the sender 101 for a primary task. The CPU 102 detects that a primary task is taking place by determining whether a program is using an entire display or at least a majority of a display by checking if an application is in, for example, "full screen" mode. Alternatively, the sender may explicitly indicate through a preference or setting that they are entering the primary task (e.g., entering a presentation mode). The CPU 102 can also determine whether the computing device is coupled with an external monitor or projecting device 105 and/or test whether a primary task program or application is receiving input and/or CPU cycles. The display 107 can be part of or external to the computing device 103.

The CPU 102 can further determine that it is the sender 101 of the message 106 who is giving the presentation. The determination can be made through authentication (e.g., using a log in process). Alternatively, the CPU 102 can detect that the sender and/or the computing device 103 is at a time and/or location where the sender 101 or other party is scheduled to perform a primary task like presenting using the computing device 103. The time could be determined using, for example, a calendar, task list, etc. which includes a scheduled conference or presentation as one of its inputs. For example, if a present date and time, and location match up with a scheduled event on a calendar, the system can conclude that a presentation is occurring. The location could be determined using, for example, global positioning system (GPS) coordinates, Wi-Fi triangulation, or the like. A sensor (e.g., infrared motion sensor) can be placed in the room to detect use of the room, and this can improve the likelihood that the presentation is taking place at the time and/or location. The CPU 102 can also detect when a user is using the computing device 103, (e.g., a mobile phone or tablet) by detecting if the display is on and the device is not sleeping. The CPU can also detect usage of the user interface, such as typing on the keyboard or talking into the microphone.

The content of the message 106 can include, for example, text, images, video, animation, or other (at least partially) visual information. A single message may contain multiple media. According to embodiments, the content could originate from a person, a program, or other source, and may be reformatted, truncated, or otherwise re-presented within the visual interruption.

In accordance with an embodiment of the present invention, the recipients can be designated before, during or after the message is created, but are designated prior to the display or display function of the computing device 103 being used for the primary task.

For example, in accordance with an embodiment of the present invention, a sender 101 can type a message into an instant messaging system that has been modified to provide the sender with the options of delivering the message immediately or with an interruption mechanism. For example, the user interface can include a selection for "delayed delivery" or some other equivalent verbiage. Further selections may include specification of a time of the later delivery, and/or targeted times, places, or events for the interruptions. As per the normal operation of such a messaging system, a recipient or recipients can also be identified. A target presenter and audience member recipient of the message may be specified. Multiple audience member recipients may be specified.

According to an embodiment, the messaging system can hold delivery of the message 106 to the recipient(s) and queue the message for a future presentation. It may ask if the sender 101 wants to queue the message for a future presentation, or the next time the recipient is looking at the display. As noted above, the sender 101 could specify an event (time/place, optionally audience) and a preferred way to deliver this message. According to an embodiment, given a limited number of specified preferences by a sender, the CPU 102 may have the capability of determining additional constraints given the provided preferences. For example, the sender 101 may state to wish the receiver a happy birthday when she is surrounded by colleagues at work. From this, the system could decide an optimum time to deliver the message, such as, for example, during a group seminar presented by the sender, or another colleague. The message could then be displayed during presentation of the seminar.

The CPU 102 further has the capability of detecting when a display of the computing device 103 is simultaneously being viewed by one or more of the intended recipients 109 of the message 106 and/or one or more of the intended recipients are in the presence of the computing device 103. The CPU 102 is further able to generate a visual interruption on a display 107 that includes the message 106 when predetermined conditions have been met.

According to an embodiment, given access to calendars, task lists, etc. on the computing devices 108 of audience members, the CPU 102 can detect those audience members who have been scheduled to attend the presentation (e.g., those audience members who have accepted invitations from the sender to the presentation) and compare them with the designated recipients of the message 106 to determine if there is a match. In other embodiments, audience members' computing devices 108, such as, for example, mobile phones, laptops, tablets or the like, can be sensed using, for example, BLUETOOTH, GPS, or detecting connection to a local area network. In the absence of audience members' computing devices 108, the audience members might be identified using badges (swipe/RFID), or through biometrics, direct reported observations, voice detection/identification, video identification, and/or grouping probabilities, and cross-referenced with the designated recipients of the message 106. In connection with grouping probabilities, the CPU 102 may be capable of recognizing that if a first person is attending during business hours, there is a high probability that a second person, who often works with the first person, is also attending. Detecting when a display is actually being viewed by one or more of the designated recipients is also possible using, for example, a camera with face recognition, and/or with eye tracking, or through other methods. The recipients may indicate their attendance by signing or selecting themselves on an electronic roster.

In accordance with embodiments of the present invention, the visual interruption can be in the form of a pop up window, such as a system notification or text message, banner, alert, ticker or any other way of interrupting what is happening on the display. A visual interruption can show reformatted, truncated, or re-presented message content on all or a portion of the screen being used by the primary task. The interruption may halt, slow, or otherwise disrupt the primary task through visual distraction, sudden movement, a sharp sound ("ding"), or other methods prior to delivering the message. Methods commonly used for humans to interrupt may be simulated, such as playing a sound clip of "clearing ones throat". The main task may be faded to make way for the interruption and then faded back in after the interruption.

In accordance with embodiments of the present invention, the visual interruptions may be of the type that might normally be expected during normal computer operation, such as pop-up windows ("pop-ups"), so they appear to be unintended interruptions, but yet they serve a purpose, such as, for example, conveying information to the audience or to a particular audience member, such as one's boss or a colleague. According to an embodiment, the message 106 can be an imitation of a message that was sent by a third party in order to provide a message to someone who is watching the presentation. For example, a presenter may hesitate to remind his/her manager to approve travel expenses. An imitation chat message disguised as being from a colleague of the presenter (but is really generated by the presenter) that asks the presenter if he got an approval can be displayed during the presentation as an indirect way to remind the presenter's manager to process travel expenses.

Other examples of the types of messages that can be displayed include, for example, congratulatory messages (e.g., "You won the award"), celebratory messages (e.g., "Happy Birthday!"), announcements for the audience (e.g., "Cookies will be served following the talk"), information that may be helpful to the audience (e.g., "There is a soda machine on the 3rd floor"), information related to the talk (e.g., "Everyone is here"), helpful self-reminders (e.g., "Try to talk loudly and project"), and education for the audience (e.g., "Talk on 3rd floor at 9:30 on quantum physics").

In accordance with embodiments of the present invention, triggering of the message 106 can be done programmatically. Once the trigger is fired, the application will proceed to display the message in either a specified way or if not defined, then in what is deemed the most appropriate format. For example, the message 106 could pop-up as an instant message, or it can trigger a screen saver to start and display the message, etc.

According to an embodiment, prior to the visual interruption, a natural language understanding component evaluates the content of the message (e.g., relative to the presentation), and/or the number or characteristics of the people for whom the message 106 would be displayed. For example messages such as "my manager is bothering me" may be deemed inappropriate, flagged and not displayed, whereas "happy birthday" may be deemed appropriate for display. In addition, the system can provide controls for presenters to filter some types of messages, and these controls may permit classification and/or prioritization of messages. Text analysis may also be used to determine the urgency of the message.

Figure 2:
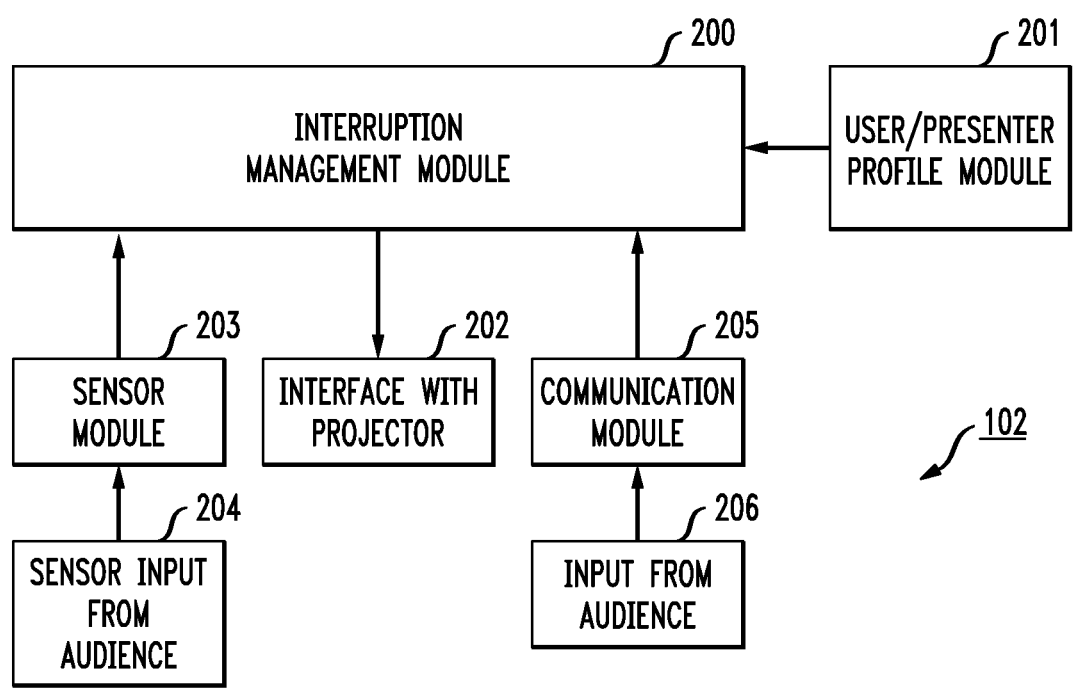
FIG. 2 is a high-level diagram of a central processing unit from FIG. 1 in a system for generating interruptions according to an exemplary embodiment of the invention.

Referring to FIG. 2, which illustrates an example of a central processing unit 102 in a system for generating interruptions according to an exemplary embodiment of the invention, a CPU 102 can include an interruption management module 200, a user/presenter profile module 201, and interface 202 for a projector (if a projector is used), a sensor module 203, which receives and processes sensor input 204 from the audience, and a communication module 205 to receive and process audience input 206. The user/presenter profile module 201 includes filters and preferences of a user, which are used when determining whether to allow a specific interruption. For example, given the system 100 in FIG. 1, a user giving a presentation on his/her computing device 103 may set certain preferences or filters to avoid display of undesired messages during a presentation. For example, for business uses, there could be controls over the allowable topics of interruption or an automated filter. The interruption management module 200 receives input from the user/presenter profile module 201 which is used in the determination of whether a proposed interrupting message should be displayed. The interruption management module 200 further determines whether the computing device 103 is being used for a primary task, such as a presentation, by, for example determining that a display and/or a display function of the computing device are being used for a primary task, and/or determining that a presenter and/or the computing device are present at a scheduled event by using an electronic calendar indicating a time and place of the event and matching the time and the place on the electronic calendar with a present time and place.

As stated above, the audience members might be identified by the CPU 102 using badges (swipe/RFID), or through biometrics, direct reported observations, voice detection/identification, video identification, and/or a camera with face recognition and/or with eye tracking. In connection with these forms of identification, the computing device 103 may include or be coupled to a sensor module 203. The sensor module 203 includes receivers and sensors, such as, for example, RFID readers, facial and voice recognition sensors, microphones, cameras, etc. The sensor module 203 receives and processes the audience sensor input 204, and supplies the data to the interruption management module 200 for further processing to determine the identity of the audience members, and whether the audience members match with any of the intended recipients of the message 106.

The communication module 205 receives audience input 206, such as, messages from people in the audience, so that these messages can be displayed, for example, on display 107, during a presentation. An example of audience input may be a message stating "Happy Birthday" to one of the audience members 109, which can be displayed assuming the message passes through the user/presenter profile module 201. The message is displayed as an interruption. In accordance with an embodiment of the present invention, the method of message input via the communication module can be the same as with message input for other embodiments of the present invention, wherein the settings for time and location are defaulted to the current time and location and the list of potential recipients of the interruption may be listed. In other words, if one is composing an interruption message ahead of a talk to interrupt with, for example, "Happy Birthday" it is essentially the same as inputting this message by an audience member during the talk to send "Happy Birthday" except that the time and place of delivery are the time and place of the current presentation.

Communication module 205 forwards audience input 206 to the interruption management module 200 to enable processing of a message for display. The communication module 205 may be part of an application that a presenter has in his/her computer that is used to present slides or can be a dedicated application that is capable of being connected to multiple communication devices, such as, for example, cell phones, laptops, tablets, etc.

Figure 3:
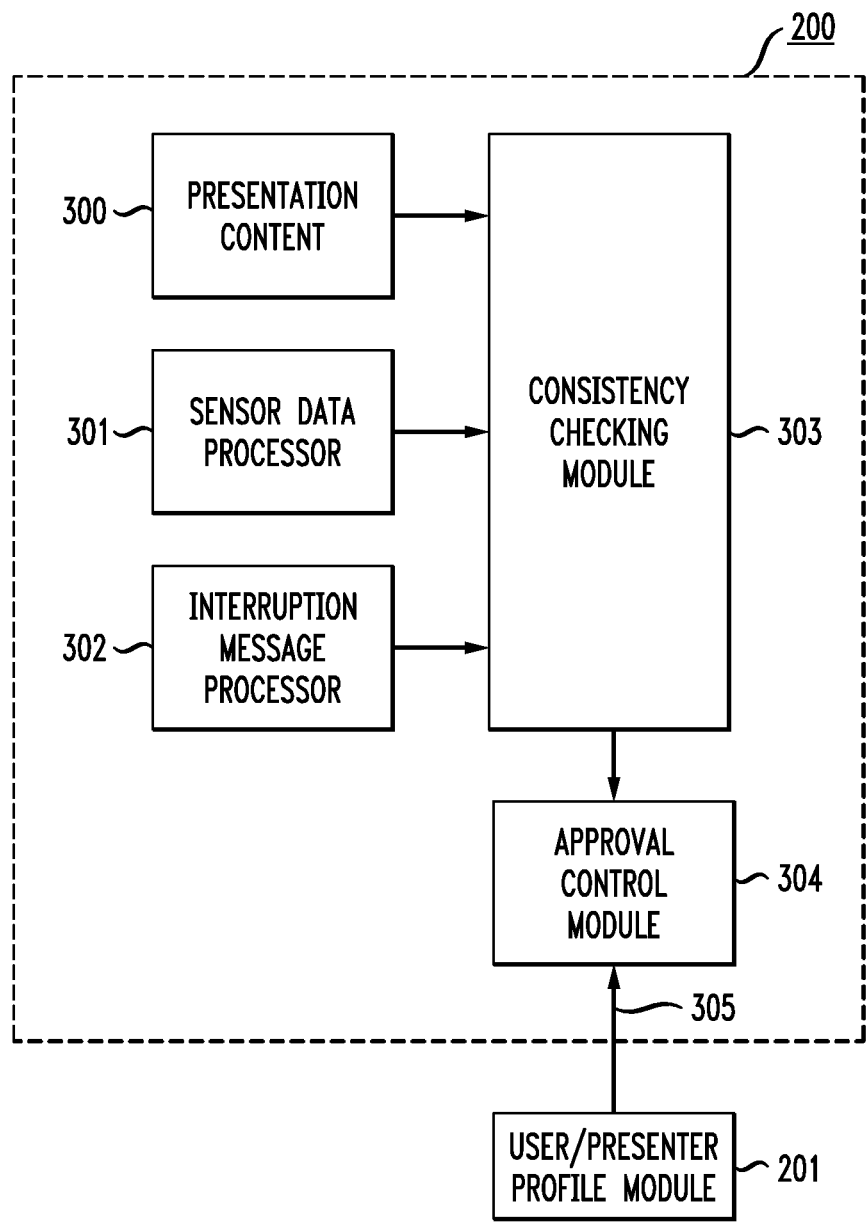
FIG. 3 is a high-level diagram of an interruption management module from FIG. 2 in a system for generating interruptions according to an exemplary embodiment of the present invention.

Referring to FIG. 3, which is an example of an interruption management module 200, according to an exemplary embodiment of the present invention, the interruption management module 200 can include a consistency checking module 303, which receives as input presentation content 300, and input from a sensor data processor 301 and an interruption message processor 302. The consistency checking module 303 provides output to an approval control module 304, which also receives input 305 from the user/presenter profile module 201 including filters and preferences of a user corresponding to whether to allow certain interrupting messages.

The sensor data processor 301 receives processed audience sensor input from the sensor module 203, and further processes the sensor data to determine the identity of the audience members. For example, the sensor data processor 301 may compare voice, eye or facial features to a database (e.g., employee database) to determine the identity of the audience members. The sensor data processor 301 then provides the resulting data to the consistency checking module 303, which then goes on to compare whether the identified audience members match with any of the intended recipients of the message 106. The consistency checking module 303 also compares the presentation content 300 with a proposed message to determine whether the message is appropriate for the presentation.

The interruption management module 200 addresses approval and timing of a message before it is included as an interruption. For example, consistency checking module 303, using data from the sensor data processor 301 and the interruption message processor 302, defines a time when to make an interruption. According to an embodiment, the consistency checking module 303 defines from sensor data from the sensor data processor 301 that people in audience are not attentive and/or bored, and it is a good time to make a break in a presentation with some unexpected interruption. Interruption message processor 302 determines if there is some funny content in messages that were received from the audience, and provides this determination to the consistency checking module 303, which, in turn, decides to provide the message for display during the presentation. According to an embodiment, in 206 (audience input) it is possible for anyone inputting a message to indicate the purpose, such as humor. The ultimate determination of whether a message is displayed is subject to approval by the approval control module 304, which determines whether a message agrees with the data from the user/presenter profile module 305.

In general, the role of the sensor data processor is to provide data from sensors in order that context that is defined from sensor data (tired, bored, no attention, excited, upset, relaxed etc.) is consistent with choice of messages to be displayed for interruption. This is done by consistency checker 303.

Figure 4:
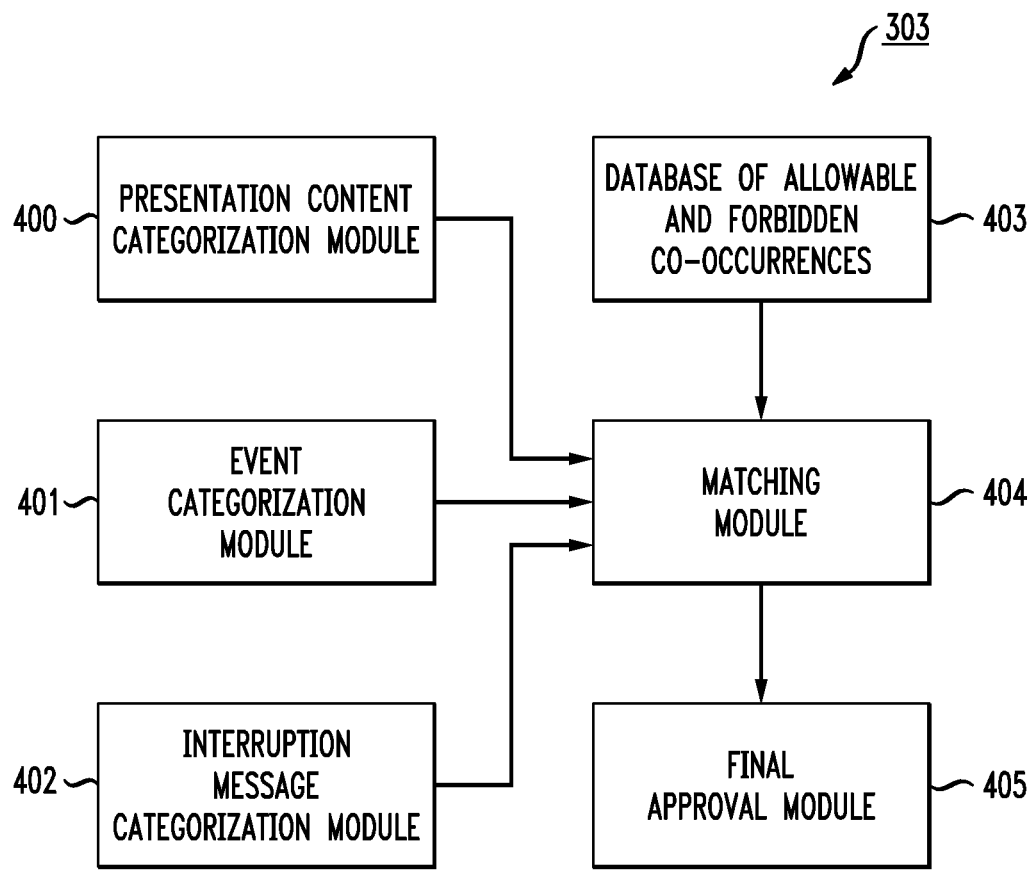
FIG. 4 is a high-level diagram of a consistency checking module from FIG. 3 in a system for generating interruptions according to an exemplary embodiment of the present invention.

Referring to FIG. 4, which is an example of a consistency checking module 303, according to an exemplary embodiment of the present invention, the consistency checking module 303 can include a presentation content categorization module 400, an event categorization module 401, an interruption message categorization module 402, a database of allowable and forbidden co-occurrences 403, a matching module 404, and a final approval module 405.

The presentation content categorization module 400 defines a topic of a presentation according to the sequence of content such as at each slide (e.g., mathematical, introduction, political, funny, sad, etc.), and can be used to decide if a particular slide is appropriate for interruption. For example, it might not be desirable to interrupt when mathematical equations are explained (since full or strict audience attention may be required for understanding of the subject matter), or it might not be desirable to interrupt with a funny message when a slide refers to a sad event.

The event categorization module 401 categorizes events from sensor data. For example, the event categorization module 401 defines conditions of people in audience (e.g., tired, bored, relaxed, attentive, upset, etc.), and can also define who is at the presentation (e.g., a manager of a presenter). The interruption message categorization module 402 defines situations when an interrupting message could be of interest to one or more audience members (e.g., message that is related to a manager not processing award payments), and, according to an embodiment, scores messages of interest based on level of interest, giving a higher score to higher interest messages. The interruption message categorization module 402 further determines to what category the message belongs (e.g., comical, political, scientific, informational, emergency, breaking news, etc.).

The database of allowable and forbidden co-occurrences 403 provides some constraints on what kind of messages are allowed (e.g., adult content messages may be forbidden), and, according to an embodiment, can also score some allowable messages (giving a higher score to some classes of messages based on past analyses of what was deemed allowable).

In connection with a potential message, the matching module 404 compares the data from modules 400, 401, and 402 with constraints from the database 403. If a message is accepted for display at the matching module 404, the message then is processed for final approval at the final approval module 405, which takes into account various additional factors, e.g., timing. In accordance with an embodiment of the present invention, a matching module 404 compares a determined message category from the message categorization module 402 with the a determined condition of the audience from the event categorization module 401 to conclude whether there is a contextual match between the message category and the audience condition. Display on an interrupting message may be permitted if there is a contextual match.

Figure 5:
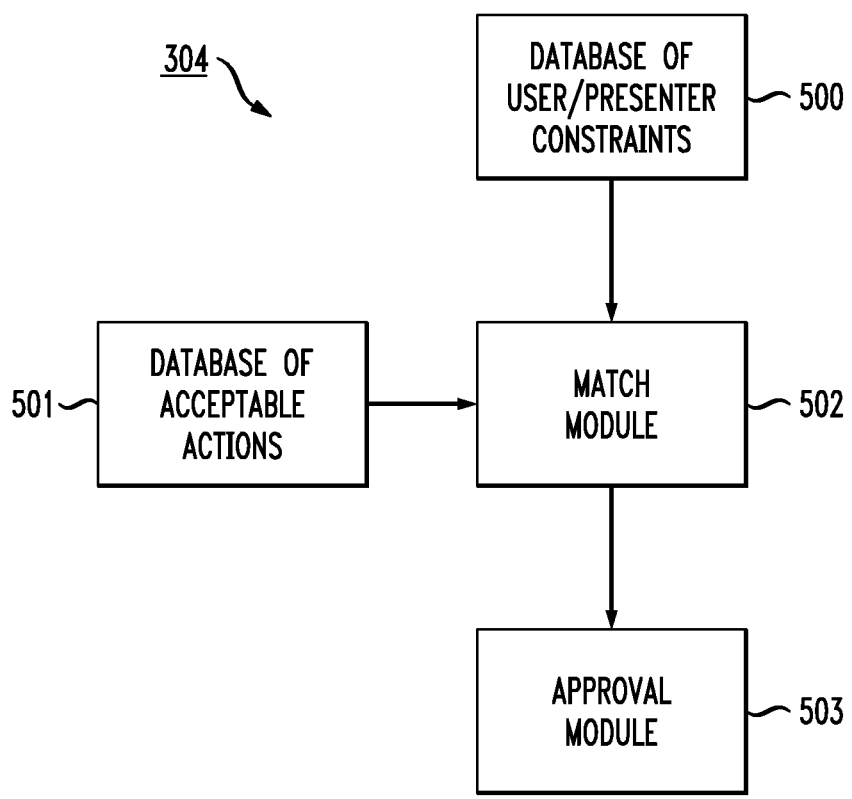
FIG. 5 is a high-level diagram of an approval control module from FIG. 3 in a system for generating interruptions according to an exemplary embodiment of the present invention.

Referring to FIG. 5, which is an example of an approval control module 304, according to an exemplary embodiment of the present invention, the approval control module 304 can include a list or database of user/presenter constraints 500 from the user/presenter profile module 201, a list or database of acceptable actions 501 depending on the constraints 500, a match module 502, which receives input from the lists 500 and 501, and an approval module 503, which determines whether to issue an approval based on an output from the match module 502.

The list of user or presenter constraints includes constraints for allowing or disallowing interrupting messages. These constraints can be produced in the user/presenter profiles, and may include, for example, timing (e.g., is there enough time for presentation to have additional distractions?), and/or may depend on type of presentation (e.g., the presentation to a CEO should not be interrupted at all, but a presentation to an employee team can be interrupted). The list of acceptable actions depending on the constraints 501 contains descriptions of what kinds of interruptions are allowed (depending on the message content and context), whether messages should be blocked, or delivered during certain time periods, how long messages can be displayed, size of message fonts, etc. Then a match module 502 determines whether possible actions from the list 501 are consistent with constraints from 500, and, if so, the interrupting message is approved by the approval module 503. If not, the interrupting message is not approved by the approval module 503.

Figure 6:
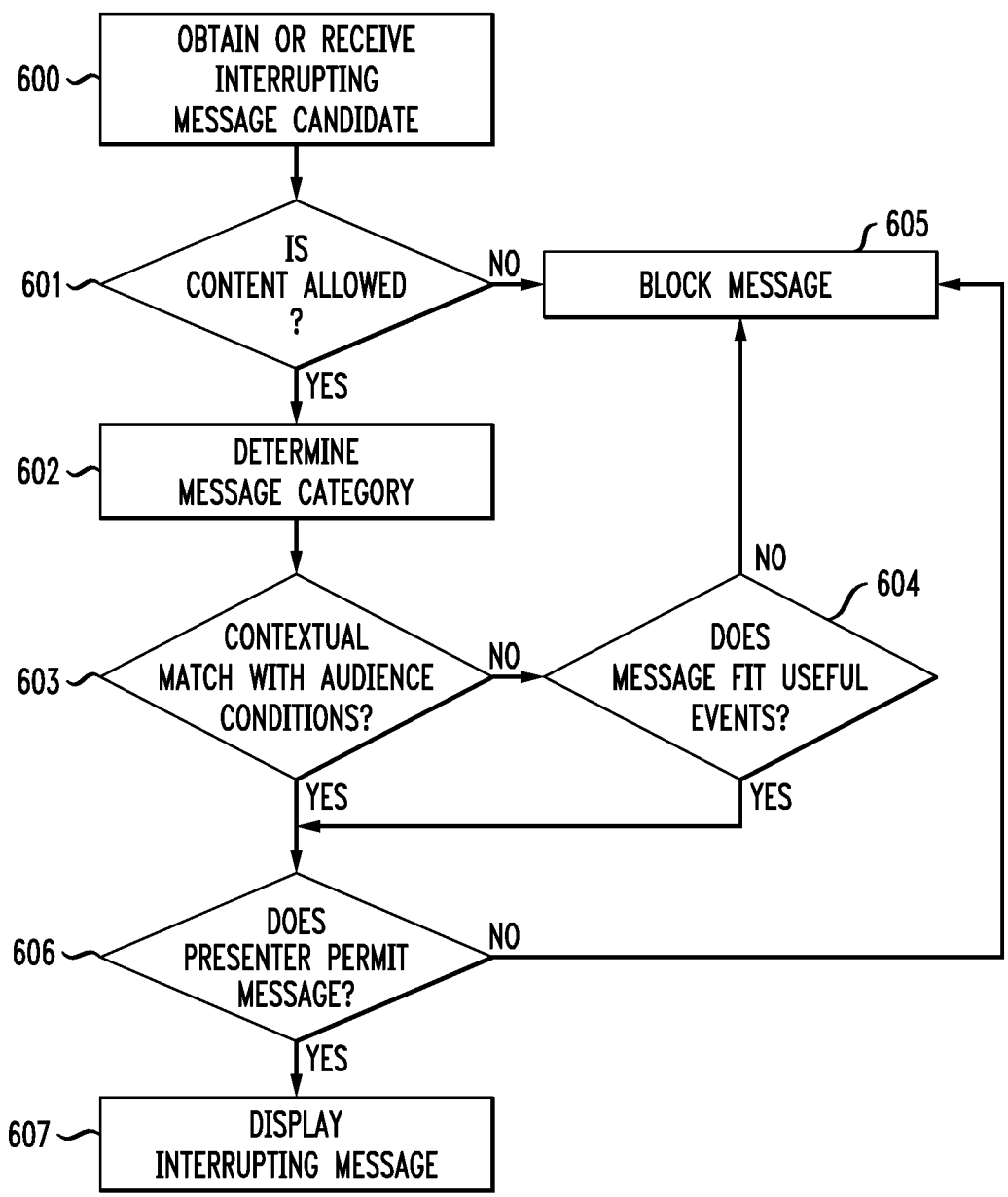
FIG. 6 is a flow diagram of a method for generating interruptions according to an exemplary embodiment of the present invention.

Referring to FIG. 6, which is a flow diagram of a method for generating interruptions, according to an exemplary embodiment of the present invention, at step 600, an interrupting message candidate is obtained or received, and at step 601, it is determined whether the content is allowed. According to an embodiment, the determination of whether a message is allowed can be made by referring to the database of allowable and forbidden co-occurrences 403 and/or the user/presenter profile module 201 discussed above. If yes at step 601, the process proceeds to step 602, where it is determined to what category the message belongs (e.g., comical, political, scientific, informational, emergency, breaking news, etc.). If no at step 601, then the process proceeds to step 605, where the message is blocked.

From step 602, the process proceeds to step 603, where there is a check for a contextual match with the audience conditions (e.g., a funny message may be a contextual match with a bored audience). Audience conditions may be detected using biometric sensors, such as, for example, video and image cameras, microphones, etc. sensing audience behavior, such as, for example, frowns, smiles, laughter, rolling eyes, sleeping, furrowed brows, talking, tapping fingers, heads down, etc. If there is a contextual match at step 603, then the process proceeds to step 606 where it is checked whether the presenter agrees with permitting the interrupting message. According to an embodiment, it can be read from a presenter profile provided in advance whether the presenter allows interruptions, and, if so, what kind and when. If the presenter agrees with permitting the interrupting message, the process proceeds to step 607, where the interrupting message is displayed. If the presenter does not agree with permitting the interrupting message, the process proceeds to step 605, where the message is blocked.

If there is no contextual match at 603, then the process proceeds to step 604, where the message is checked for other categories to determine, for example, if the message fits useful events in some way (e.g., message must be displayed for a manager in the auditorium, informational or emergency message, etc.). If there are no other critical categories at step 604, the process proceeds to step 605 where the message is blocked. However, if there are other critical categories, the process proceeds to step 606. In the case of an emergency, the process can skip step 606 and proceed directly to display of the interrupting message at block 607.

Figure 7:
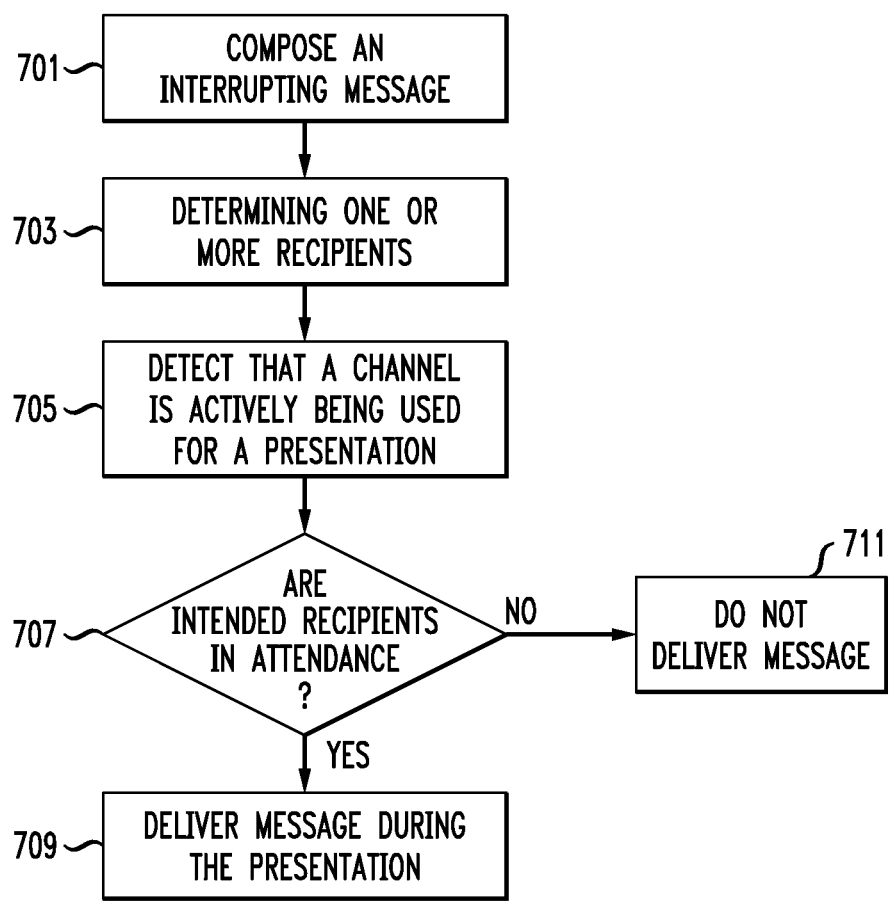
FIG. 7 is a flow diagram of a method for generating interruptions according to an exemplary embodiment of the present invention.

FIG. 7 is a flow diagram of a method for generating interruptions according to an exemplary embodiment of the present invention. More specifically, according to an embodiment, a method for generating an interruption during a presentation to target recipients comprises composing an interrupting message at block 701, determining one or more recipients of the message at block 703, and detecting that a channel (e.g., a visual channel, such as a display on a computing device, or an audio channel, such as a networked audio conference) is actively being used for a presentation at block 705. For example, as noted above, a CPU can detect that a presentation is taking place by determining whether a program is using an entire display or at least a majority of a display by checking if an application is in, for example, "full screen" mode. In another alternative, a CPU can detect that a presentation is occurring based on scheduled or calendared events, and whether the computing device is present at the scheduled or calendared event.

At block 707, it is determined whether the intended recipients in attendance at the presentation. As noted above, this determination can be made or deduced by, for example, detecting those audience members who have been scheduled to attend the presentation given access to calendars, task lists, etc. on the computing devices of audience members, sensing audience members' computing devices using, for example, BLUETOOTH, GPS, or network triangulation, using badges (e.g., swipe/RFID), using biometrics, direct reported observations, voice detection/identification, video identification, grouping probabilities, face recognition, and/or eye tracking. According to an embodiment, a probability that the recipient(s) is/are attending the presentation can be computed, and an interruption can be generated during the presentation if the probability exceeds a predetermined threshold.

If it is determined at block 707 that the intended recipients are in attendance, the message is delivered during the presentation at block 709. If it is determined at block 707 that the intended recipients are not in attendance, or not enough of the intended recipients are in attendance, the message is not delivered at block 711.

According to embodiments, a format of the interrupting message may be as a peripheral part of the display, such as an unobtrusive temporary banner or small area of a screen, or a peripheral part of an audio broadcast. According to an embodiment, the originator of message can receive a notification that the message was, or was likely delivered to the intended recipient(s). The originator of the message can be the presenter, an audience member, a third party that is not the presenter or an audience member, or a computer.

Embodiments of the present invention permit a presenter to interrupt him/herself to enhance presentation style. For example, a presenter may like to make a brief pause, thereby allowing, at a particular point in time, interruptions to come on his/her display. Reasons for pauses can be that the presenter needs to recall a speaking point and/or search in his/her notes, and/or noticing that people in the audience stopped to paying attention to the presentation and anticipating that interruptions might bring the audience's attention back.

In accordance with embodiments of the present invention, messages can look as though they are coming from a source other than the presenter so that messages could be delivered in situations where the speaker does not want to personally deliver the message. Moreover, a targeted audience member can get the message without admitting to others that they were the intended recipient of the message.

Embodiments of the present invention also permit delivery of messages intended for the entire audience and for particular members of the audience when it is understood that other people in the audience and the presenter will see the message. Further, embodiments of the present invention provide an alternative medium for the delivery of messages to members of the audience that may not have access to their personal electronic devices.

Embodiments of the present invention may be used for situations, such as emergencies (e.g., there are needed medical personnel in the audience or notifications of family emergencies), during trade shows, conferences or conventions to notify attendants watching a particular presentation that another presentation on their agenda is starting, and/or for notifications to healthcare personnel of a change in status of their patients.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1-7 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 8:
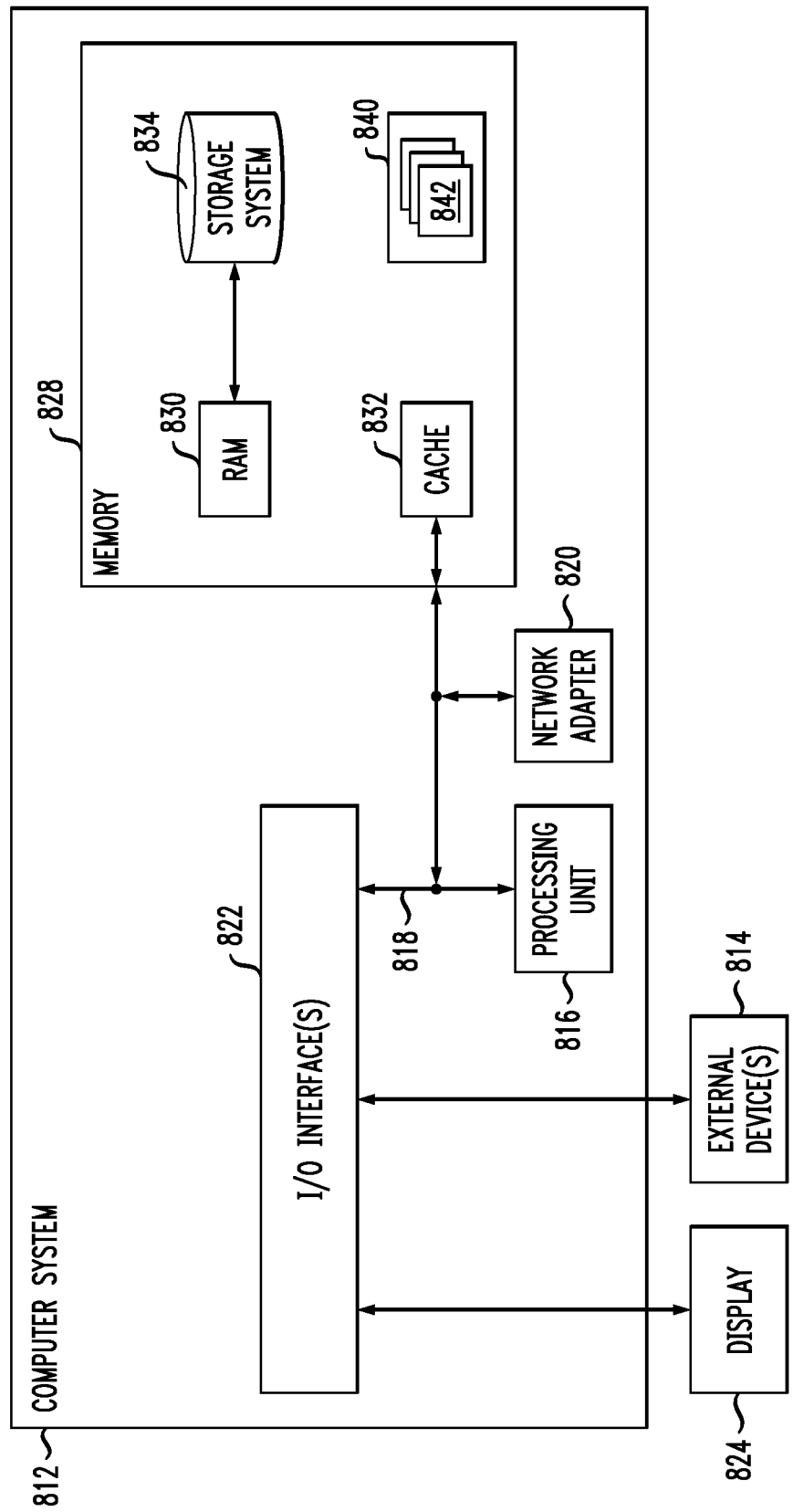
FIG. 8 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for generating interruptions, comprising:
a messaging module capable of generating a message for one or more recipients; and
an interruption management module capable of detecting that a computing device is being used for a presentation, concluding that the one or more recipients are in an audience for the presentation, and interrupting the presentation with the message after concluding that the one or more recipients are in the audience.

2. The system according to claim 1, wherein the interruption management module is capable of determining that at least one of a display and a display function of the computing device are being used for a primary task.

3. The system according to claim 1, wherein the interruption management module is capable of determining that at least one of a presenter and the computing device are present at a scheduled event.

4. The system according to claim 3, wherein the interruption management module is capable of making the determination using an electronic calendar indicating a time and place of the event and matching the time and the place on the electronic calendar with a present time and place.

5. The system according to claim 1, wherein the interruption management module is capable of performing said concluding by retrieving electronic calendars of the one or more recipients, and determining that the one or more recipients are scheduled to attend the presentation.

6. The system according to claim 1, further comprising a sensor module, wherein the interruption management module together with the sensor module are capable of performing said concluding by at least one of sensing a presence of a computing device of the one or more recipients at the presentation and identifying the one or more recipients in the audience using at least one of electronic badges, biometrics, video identification, and facial recognition.

7. The system according to claim 1, wherein the interruption management module is capable of performing said concluding by calculating a probability that the one or more recipients are in the audience and comparing the calculated probability to a threshold probability.

8. The system according to claim 1, further comprising:
an interruption message categorization module capable of determining a category of the message;
an event categorization module capable of determining a condition of the audience; and
a matching module capable of comparing the determined category with the determined condition of the audience to conclude whether there is a contextual match between the message category and the audience condition.

9. An article of manufacture comprising a computer readable storage medium comprising program code tangibly embodied thereon, which when executed by a computer, performs method steps for generating interruptions, the method steps comprising:
- generating a message for one or more recipients;
- detecting that a computing device is being used for a presentation;
- concluding that the one or more recipients are in an audience for the presentation; and
- after concluding that the one or more recipients are in the audience, interrupting the presentation with the message.

10. The article of manufacture according to claim 9, wherein said detecting comprises determining that at least one of a display and a display function of the computing device are being used for a primary task.

11. The article of manufacture according to claim 9, wherein said detecting comprises determining that at least one of a presenter and the computing device are present at a scheduled event.

12. The article of manufacture according to claim 11, wherein the determination is made using an electronic calendar indicating a time and place of the event and matching the time and the place on the electronic calendar with a present time and place.

13. The article of manufacture according to claim 9, wherein said concluding is performed by retrieving electronic calendars of the one or more recipients, and determining that the one or more recipients are scheduled to attend the presentation.

14. The article of manufacture according to claim 9, wherein said concluding is performed by sensing a presence of a computing device of the one or more recipients at the presentation.

15. The article of manufacture according to claim 9, wherein said concluding is performed by identifying the one or more recipients in the audience using at least one of electronic badges, biometrics, video identification, and facial recognition.

16. The article of manufacture according to claim 9, wherein said concluding is performed by calculating a probability that the one or more recipients are in the audience based on a presence of another person in the audience.

17. The article of manufacture according to claim 9, wherein said concluding is performed by calculating a probability that the one or more recipients are in the audience and comparing the calculated probability to a threshold probability.

18. The article of manufacture according to claim 9, wherein the method steps further comprise:
- determining a category of the message;
- determining a condition of the audience; and
- comparing the determined category with the determined condition of the audience to conclude whether there is a contextual match between the message category and the audience condition.

19. The article of manufacture according to claim 18, wherein the method steps further comprise permitting display of the message based on a presence of the contextual match.

* * * * *